US011427205B2

(12) United States Patent
Sugano et al.

(10) Patent No.: US 11,427,205 B2
(45) Date of Patent: Aug. 30, 2022

(54) VEHICLE STOP SUPPORT SYSTEM

(71) Applicant: Mazda Motor Corporation, Hiroshima (JP)

(72) Inventors: Takashi Sugano, Hiroshima (JP); Takuya Yamashita, Hiroshima (JP); Takesato Fushima, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 506 days.

(21) Appl. No.: 16/545,171

(22) Filed: Aug. 20, 2019

(65) Prior Publication Data
US 2020/0070843 A1 Mar. 5, 2020

(30) Foreign Application Priority Data

Aug. 28, 2018 (JP) .............................. JP2018-159070

(51) Int. Cl.
| | |
|---|---|
| *B60W 40/09* | (2012.01) |
| *B60K 28/06* | (2006.01) |
| *B60W 10/04* | (2006.01) |
| *B60W 10/18* | (2012.01) |
| *B60W 30/18* | (2012.01) |
| *B60W 10/20* | (2006.01) |
| *B60W 40/08* | (2012.01) |

(52) U.S. Cl.
CPC ............. *B60W 40/09* (2013.01); *B60K 28/06* (2013.01); *B60W 10/04* (2013.01); *B60W 10/182* (2013.01); *B60W 10/20* (2013.01); *B60W 30/18054* (2013.01); *B60W 2040/0818* (2013.01); *B60W 2040/0872* (2013.01); *B60W 2420/42* (2013.01)

(58) Field of Classification Search
CPC .... B60W 40/09; B60W 10/04; B60W 10/182; B60W 10/20; B60W 30/18054; B60W 2040/0818; B60W 2040/0872; B60W 2420/42; B60W 2540/221; B60W 2540/223; B60W 2540/225; B60W 2540/26; B60W 2554/00; B60W 2556/50; B60W 10/06; B60W 10/184; B60W 30/0956; B60K 28/06
See application file for complete search history.

(56) References Cited

U.S. PATENT DOCUMENTS

2017/0297567 A1   10/2017   Matsumura

FOREIGN PATENT DOCUMENTS

| JP | 2017001519 A | 1/2017 |
| JP | 2017190048 A | 10/2017 |

*Primary Examiner* — Rodney A Butler
(74) *Attorney, Agent, or Firm* — Alleman Hall Creasman & Tuttle LLP

(57) ABSTRACT

Provided is a vehicle stop support system for supporting vehicle stop in an emergency condition. The vehicle stop support system detects a physical abnormality of a driver; sets a stop point; and controls a vehicle to travel to the stop point and stop at the stop point. The system is operable to: calculate, with respect to each of a plurality of stop point candidates, a first index value which increases with an increase in a lateral acceleration, a second index value which increases with an increase in rear-end collision risk, a third index value based on the detected abnormality, and a gross index value, wherein the gross index value is obtained by subjecting the first, second, and third index values to weighting, and summing the resulting weighted index values; and then set one of candidates which is smallest in terms of the gross index value, as the stop point.

9 Claims, 9 Drawing Sheets

| Disorder/Disease | Physical Abnormality Energy per Unit Time |
|---|---|
| Paralysis | $\Delta E_{t1}$ |
| Epilepsy | $\Delta E_{t3}$ |
| Influenza (high fever) | $\Delta E_{t5}$ |
| Myocardial Infarction | $\Delta E_{t8}$ |
| Subarachnoid Hemorrhage | $\Delta E_{t10}$ |

FIG. 10

| State of Consciousness | Open/closed state of eyes | Line-Of-Sight Direction | Center-Of-Gravity Position | W₁ |
|---|---|---|---|---|
| Conscious | Open state | Traveling direction | Adequate | 0.1 |
| | | | Inadequate | 0.5 |
| | | direction other than traveling direction | Adequate | 0.3 |
| | | | Inadequate | 0.7 |
| | Closed state | | Adequate | 0.5 |
| | | | Inadequate | 0.9 |
| Unconscious | | | Adequate | 0.8 |
| | | | Inadequate | 1.0 |

VEHICLE STOP SUPPORT SYSTEM

TECHNICAL FIELD

The present invention relates to a vehicle stop support system for supporting stop of a vehicle which is traveling.

BACKGROUND ART

There has been known a system for causing a vehicle to stop on behalf of a driver, in the event that the driver becomes unable to continue safe driving due to a sudden change in his/her body condition or the like (such a driver will hereinafter be referred to also as "driver in an emergency condition"). For example, in the following Patent Document 1, there is disclosed a system for causing a vehicle to stop in an evacuation space, upon detection of a physical abnormality of a driver. Further, as an improvement to such a system, in the Patent Document 2, there is disclosed prohibiting a vehicle from stopping in an area having poor visibility. This vehicle stop support system makes it possible to keep a driver in an emergency condition, a fellow passenger and other road user away from danger of a vehicle collision, and rescue the driver after stop of the vehicle.

CITATION LIST

Patent Document

Patent Document 1: JP 2017-001519A
Patent Document 2: JP 2017-190048A

SUMMARY OF INVENTION

Technical Problem

In recent years, along with development of technologies for automated vehicle driving, technologies concerning components such as a high-accuracy geographic map and a vehicle-mounted camera have been making great progress. In the field of vehicle stop support systems, it is expected to effectively utilize information provided from these components to support vehicle stop so as to further contribute to rescue of a driver in an emergency condition.

The present invention has been made to fulfill this demand, and an object of the present invention to provide a vehicle stop support system capable of support vehicle stop so as to further contribute to rescue of a driver in an emergency condition.

Solution to Technical Problem

In order to achieve the above object, the present invention provides a vehicle stop support system for supporting stop of a vehicle which is traveling. The vehicle stop support system comprises: an abnormality detection part for detecting a physical abnormality of a driver; a candidate detection part for detecting a plurality of stop point candidates which exist in a traveling direction of the vehicle; an acceleration estimation part for estimating a lateral acceleration to be generated during traveling of the vehicle to each of the stop point candidates; a risk estimation part for estimating a rear-end collision risk which is a risk that, when assuming that the vehicle stops at each of the stop point candidates, the vehicle will be rear-ended by a following vehicle; a stop point setting part for setting a stop point; and a vehicle control part for controlling the vehicle to travel to the stop point and stop at the stop point, wherein the stop point setting part is operable to calculate, with respect to each of the stop point candidates, a first index value which increases along with an increase in the lateral acceleration, a second index value which increases along with an increase in the rear-end collision risk, a third index value which is determined based on the abnormality detected by the abnormality detection part, and a gross index value, wherein the gross index value is obtained by subjecting the first index value, the second index value and the third index value to weighting, and summing the resulting weighted index values; and then set one of the plurality of stop point candidates which is smallest in terms of the gross index value, as the stop point.

In order to quickly start a rescue operation, it is necessary to stop the vehicle (own vehicle) at the stop point as quick as possible. As the physical abnormality of the driver has a higher urgency, the vehicle is required to reach the stop point earlier.

However, if an excessively large lateral acceleration (i.e., acceleration in a width direction of the vehicle) is generated during traveling of the vehicle to the stop point, the posture of the driver who is in an emergency condition is likely to become largely imbalanced, leading to worsening of the body condition of the driver. Further, in a case where the vehicle is stopped at a point with a high risk that the vehicle will be rear-ended by the following vehicle, it becomes difficult to safely carry out a rescue operation, so that the body condition of the driver is likely to become worse. In order to support vehicle stop so as to further contribute to rescue of the driver, it is necessary to set the stop point while taking into account such various factors.

As a result of diligent researches for fulfilling the demand, the inventors found that an adequate stop point can be set by evaluating a plurality of stop point candidates using a new index value which is referred to as "gross index value". The "gross index value" is obtained by subjecting a first index value, a second index value and a third index value to weighting, and summing the resulting weighted index values. The "first index value" is set to increase along with an increase in the lateral acceleration. The "second index value" is set to increase along with an increase in the rear-end collision risk. The "third index value" is determined based on the abnormality detected by the abnormality detection part.

In the above vehicle stop support system of the present invention, one of the plurality of stop point candidates which is smallest in terms of the gross index value is set as the stop point. This makes it possible to comprehensively evaluate a burden imposed on the driver by the lateral acceleration, a burden imposed on the driver by the rear-end collision risk, and a burden imposed on the driver by the physical abnormality of the driver, and set the stop point under the condition that the burdens are well balanced.

Preferably, in the vehicle stop support system of the present invention, the stop point setting part is operable to calculate the first index value by integrating values of the lateral acceleration to be generated during traveling of the vehicle to each of the stop point candidates.

If a relatively large lateral acceleration is suddenly generated due to sudden steering manipulation or the like, the burden imposed on the driver is increased. Further, even in a case where the lateral acceleration is relatively small, if it is continuously generated, the burden on the driver is increased.

According to the above feature, values of the lateral acceleration to be generated during traveling of the vehicle to each of the stop point candidates are integrated, so that a continuously-generated relatively-small lateral acceleration can also be evaluated as the burden on the driver. This makes it possible to more precisely determine the first index value to set the stop point.

Preferably, in the vehicle stop support system of the present invention, the abnormality detection part is operable to detect a state of consciousness of the driver, wherein the stop point setting part is operable to set a weighting to be assigned to the first index value when the driver is unconscious, to become greater than a weighting to be assigned to the first index value when the driver is conscious.

When the driver is unconscious, the driver becomes difficult to strain to physically resist against the lateral acceleration.

According to the above feature, the weighting to be assigned to the first index value when the driver is unconscious is set to become greater than the weighting to be assigned to the first index value when the driver is conscious, so that it is possible to set the stop point under the condition that the first index value is relatively small. This makes it possible to suppress the situation where the posture of the driver becomes largely imbalanced, even when the driver is unconscious.

Preferably, in the vehicle stop support system of the present invention, the abnormality detection part is operable to detect an open/closed state of eyes of the driver, wherein the stop point setting part is operable to set a weighting to be assigned to the first index value when the eyes of the driver are in the closed state, to become greater than a weighting to be assigned to the first index value when the eyes of the driver are in the open state.

When the eyes of the driver are in the closed state, the driver becomes difficult to strain by predicting the behavior of the vehicle.

According to the above feature, the weighting to be assigned to the first index value when the eyes of the driver are in the closed state is set to become greater than the weighting to be assigned to the first index value when the eyes of the driver are in the open state, so that it is possible to set the stop point under the condition that the first index value is relatively small. This makes it possible to suppress the situation where the posture of the driver becomes largely imbalanced, even when the eyes of the driver are in the closed state.

Preferably, in the vehicle stop support system of the present invention, the abnormality detection part is operable to detect a line-of-sight direction of the driver, and determine whether or not the line-of-sight direction of the driver is coincident with the traveling direction of the vehicle, wherein the stop point setting part is operable to set a weighting to be assigned to the first index value when the line-of-sight direction of the driver is not coincident with the traveling direction of the vehicle, to become greater than a weighting to be assigned to the first index value when the line-of-sight direction of the driver is coincident with the traveling direction of the vehicle.

"The line-of-sight direction of the driver is coincident with the traveling direction of the vehicle" means that the line-of-sight direction of the driver falls within a given range including the traveling direction of the vehicle. That is, "the line-of-sight direction of the driver is coincident with the traveling direction of the vehicle" means that the line-of-sight direction of the driver is approximately coincident with the traveling direction of the vehicle, but does not mean that the line-of-sight direction of the driver is exactly coincident with the traveling direction of the vehicle.

When the line-of-sight direction of the driver is not coincident with the traveling direction of the vehicle the driver becomes difficult to strain by predicting the behavior of the vehicle.

According to the above feature, the weighting to be assigned to the first index value when the line-of-sight direction of the driver is not coincident with the traveling direction of the vehicle, to become greater than the weighting to be assigned to the first index value when the line-of-sight direction of the driver is coincident with the traveling direction of the vehicle, so that it is possible to set the stop point under the condition that the first index value is relatively small. This makes it possible to suppress the situation where the posture of the driver becomes largely imbalanced, even when the line-of-sight direction of the driver is not coincident with the traveling direction of the vehicle.

Preferably, in the vehicle stop support system of the present invention, the risk estimation part is operable to estimate the rear-end collision risk such that it becomes higher as a following vehicle visible distance with respect to each of the plurality of stop point candidates becomes smaller.

The "following vehicle visible distance" means the maximum value of a distance from the following vehicle to the own vehicle in a state in which the own vehicle is visible from the following vehicle. For example, in a situation where a vehicle stops on a curved or undulating road, or in a situation where there are obstacles such as walls or roadside trees around a road, the "following vehicle visible distance" with respect to a point where the vehicle stops is relatively small. On the other hand, in a situation where the vehicle stops on a straight or flat road, or in a situation where there are few obstacles around a road, the "following vehicle visible distance" with respect to a point where the vehicle stops is relatively large.

According to the above feature, as the following vehicle visible distance becomes smaller, i.e., as the stop point candidate has a higher degree of difficulty in allowing the following vehicle to be braked so as to avoid a rear-end collision, the rear-end collision risk is estimated such that it becomes higher, and the second index value is calculated such that it becomes larger. This makes it possible to set the stop point such that it enables the vehicle to be stopped more safely.

Preferably, the vehicle stop support system of the present invention, the stop point setting part is operable to calculate the second index value such that it becomes larger as a relative vehicle speed of the following vehicle with respect to the vehicle stopping at each of the plurality of stop point candidates becomes larger.

According to this feature, as a relative vehicle speed of the following vehicle with respect to the own vehicle becomes higher, i.e., as the stop point candidate has a higher degree of difficulty in allowing the following vehicle to be braked so as to avoid a rear-end collision, the second index value is calculated such that it becomes larger. This makes it possible to set the stop point such that it enables the vehicle to be stopped more safely.

More preferably, in the above vehicle stop support system, the stop point setting part is operable to estimate the relative vehicle speed, based on an upper speed limit set to each of the plurality of stop point candidates in accordance with law or regulation.

This makes it possible to easily estimate the relative vehicle speed of the following vehicle with respect to the own vehicle stopping at each of the plurality of stop point candidates.

Preferably, the vehicle stop support system of the present invention further comprises a storage part preliminarily storing therein a plurality of values each corresponding to a respective one of a plurality of physical abnormalities, wherein the stop point setting part is operable to calculate the third index value by reading, from the storage part, one of the stored values which corresponds to the abnormality detected by the abnormality detection part, and multiplying the read value by a time period required to reach each of the plurality of stop point candidates.

According to this feature, the third index value is calculated based on the physical abnormality of the driver detected by the abnormality detection part, and the time period required to reach each of the plurality of stop point candidates. Thus, for example, by setting a relatively large value with respect to a physical abnormality having a relatively high urgency, the third index value is calculated as a relatively larger value. Thus, in a case where the physical abnormality of the driver has a relatively high urgency, it becomes possible to quickly stop the vehicle to start a rescue operation. On the other hand, by setting a relatively small value with respect to a physical abnormality having a relatively low urgency, it becomes possible to set the stop point from among a larger number of stop point candidates.

Further, the plurality of values each corresponding to a respective one of the plurality of physical abnormalities are preliminarily stored in the storage part, so that it is possible to suppress a situation where, due to disturbance or the like, the third index value is calculated undesirably based on an inappropriately low or high value, with respect to each of the plurality of physical abnormalities. This makes it possible to set the stop point based on the physical abnormality of the driver.

Effect of Invention

The present invention can provide a vehicle stop support system capable of supporting vehicle stop so as to further contribute to rescue of a driver in an emergency condition.

BRIEF DESCRIPTION OF DRAWINGS

FIG. 10 is a table showing a correspondence relationship between a body condition of a driver and a weighting factor.

DESCRIPTION OF EMBODIMENTS

With reference to accompanying drawings, one embodiment of the present invention will now be described. For the sake of facilitating understanding of the description, the same reference sign is assigned to the same elements or components in the figures, and duplicated description of such a component will be omitted.

Figure 1:
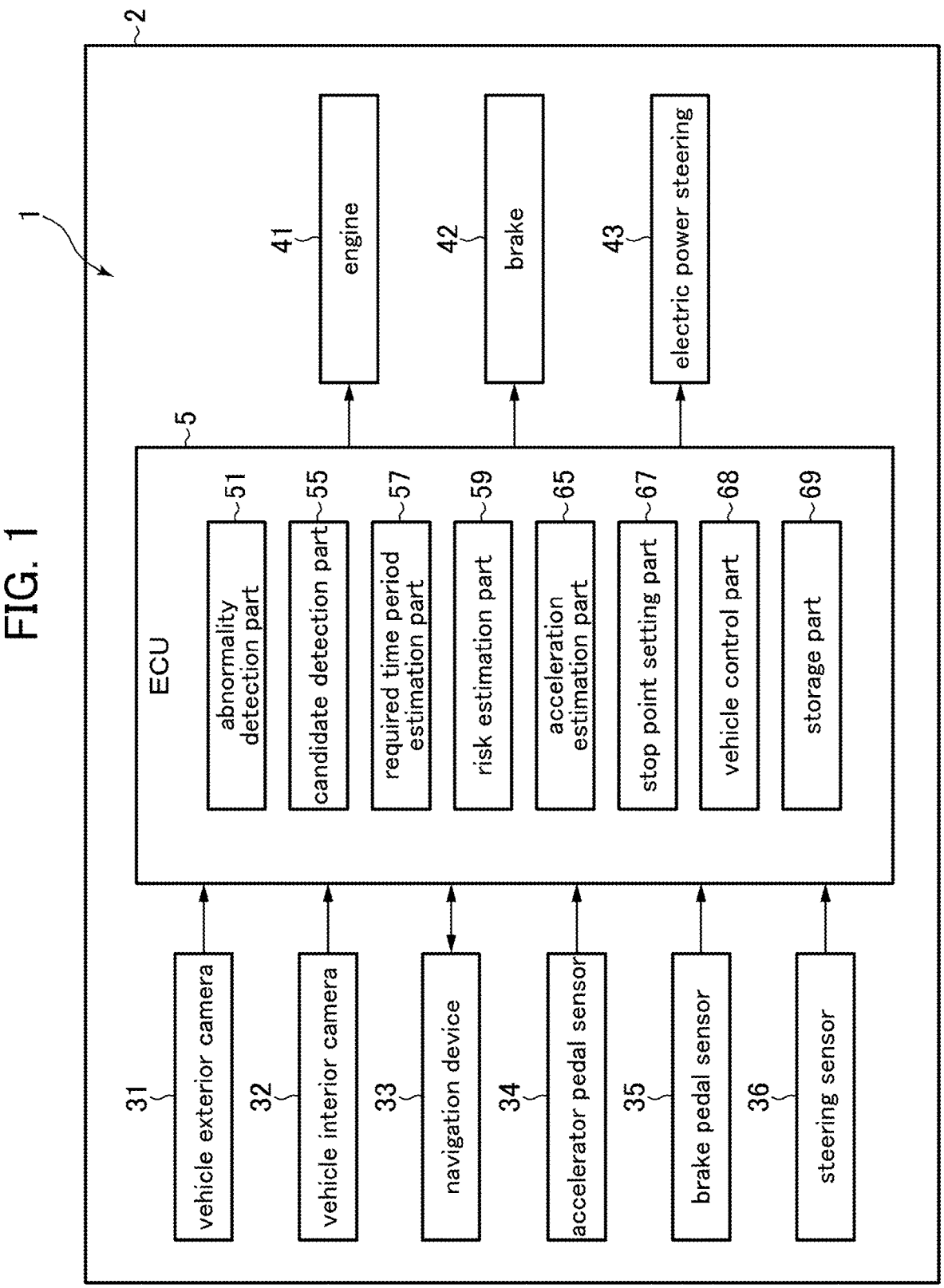
FIG. 1 is a block diagram showing a vehicle stop support system according to one embodiment of the present invention.

First of all, with reference to FIG. 1, the configuration of a vehicle strop system 1 (hereinafter referred to as "system 1") according to this embodiment will be described. FIG. 1 is a block diagram showing the system 1. The system 1 is equipped in a vehicle, and operable to support stop of the vehicle which is traveling, as an emergency measure. In this Description, a vehicle equipped with the system 1 will be referred to as "vehicle 2".

Further, in this Description, a forward movement direction of the vehicle 2 will be referred to as "front" or "forward", and a backward movement direction of the vehicle 2 will be referred to as "back" or "backward". Further, a left side with respect to the vehicle 2 oriented in the forward movement direction will be referred to as "left" or "leftward".

The system 1 comprises a vehicle exterior camera 31, a vehicle interior camera 32, a navigation device 33, an accelerator pedal sensor 34, a brake pedal sensor 35, a steering sensor 36, and an ECU (Electronic Control Unit) 5.

The vehicle exterior camera 31 is operable to take an image of the outside of the vehicle 2, particularly, the front of the vehicle 2, to acquire image data thereabout. The vehicle exterior camera 31 is composed of, e.g., an image sensor, and installed to a non-illustrated rearview mirror of the vehicle 2. The vehicle exterior camera 31 is also operable to transmit a signal corresponding to the acquired image data, to the ECU 5.

The vehicle interior camera 32 is operable to take an image of the inside of the vehicle 2 to acquire image data thereabout. Specifically, the vehicle interior camera 32 is operable to take an image of a range including the upper body of a driver in a passenger compartment of the vehicle 2. The vehicle interior camera 32 is composed of, e.g., an image sensor, and installed to a non-illustrated instrument panel of the vehicle 2. The vehicle interior camera 32 is also operable to transmit a signal corresponding to the acquired image data, to the ECU 5.

The navigation device 33 is capable of providing various information to a passenger of the vehicle 2. The navigation device 33 stores therein map information or is capable of acquiring map information through communication with a server outside the vehicle 2. The map information contains a road configuration, an upper speed limit assigned to each road in accordance with law or regulation, and a traffic state of each road. The map information also contains information regarding points where ambulances are deployed, such as a fire department and a medical center. The navigation device 33 comprises a sensor for detecting the location of the vehicle 2, such as a GPS (Global Positioning System) sensor or a self-contained navigation sensor. The navigation device 33 is operable to provide, to the passenger, map information, and information regarding the position of the vehicle 2 on the map, a time period required for the vehicle 2 to reach a given point, and others, with sound or display. The navigation device 33 is configured to be communicable with the ECU 5, and operable, in response to a request from the ECU 5, to transmit a signal to the ECU 5, thereby providing a variety of information thereto.

The accelerator pedal sensor 34 is a sensor for detecting a depression amount of a non-illustrated accelerator pedal of the vehicle 2. The accelerator pedal sensor 34 is operable to transmit, to the ECU 5, a signal corresponding to the detected depression amount.

The brake pedal sensor 35 is a sensor for detecting a depression amount of a non-illustrated brake pedal of the vehicle 2. The brake pedal sensor 35 is operable to transmit, to the ECU 5, a signal corresponding to the detected depression amount.

The steering sensor 36 is a sensor for detecting a steering direction and a steering angle of a non-illustrated steering wheel of the vehicle 2. For example, the steering sensor 36 is provided with an encoder, and operable to count the number of slits in a plate rotatable together with the steering wheel. The steering sensor 36 is operable to transmit, to the ECU 5, a signal corresponding to the detected steering direction and steering angle.

The ECU 5 is a control device for controlling components through signal transmission and receiving with respect thereto. The ECU 5 is partly or entirely constructed as an analog circuit or as a digital processor. ECU 5 comprises an abnormality detection part 51, a candidate detection part 55, a required time period estimation part 57, a risk estimation part 59, an acceleration estimation part 65, a stop point setting part 67, a vehicle control part 68, and a storage part 69.

In FIG. 1, each function of the ECU 5 is shown as a block. However, it should be understood that a software modules incorporated in the analog circuit or digital processor of the ECU 5 needs not necessarily be divided as shown in FIG. 1. That is, each of the function block shown in FIG. 1 may be further segmentalized, or two or more of the function blocks may be integrated into a single function block which has functions of the two or more function blocks. It is apparent to a person of ordinary skill in the art that the internal configuration of the ECU 5 may be appropriately modified as long as the ECU 5 is configured to be capable of executing the after-mentioned processing routine.

The abnormality detection part 51 is configured to detect a physical abnormality of the driver of the vehicle 2. The abnormality detection part 51 is operable to detect the physical abnormality of the driver, based on signals received by the ECU 5 from the vehicle interior camera 32, the accelerator pedal sensor 34, the brake pedal sensor 35 and the steering sensor 36.

For example, the abnormality detection part 51 is operable to subject the image data acquired by the vehicle interior camera 32 to given processing to identify the upper body, head region, face, eyes, etc., of the driver and acquires information regarding the identified regions. Further, the abnormality detection part 51 is operable to detect information regarding driving manipulations of the driver, based on the signals received from the accelerator pedal sensor 34, the brake pedal sensor 35 and the steering sensor 36. Then, the abnormality detection part 51 is operable to perform a given calculation based on the acquired information to detect the state of consciousness of the driver, an open/closed state of the eyes of the driver, a line-of-sight direction of the driver, the position of the center of gravity of the driver, etc.

Further, the abnormality detection part 51 is operable to determine whether or not the line-of-sight direction of the driver is coincident with a traveling direction of the vehicle 2. Specifically, the abnormality detection part 51 is operable to determine whether or not the line-of-sight direction of the driver falls within a given range including the traveling direction of the vehicle 2. Additionally, the abnormality detection part 51 is operable to determine whether or not the center-of-gravity position of the driver is adequate, based on a distance from a seating surface of a seat on which the driver sits to the center of gravity of the driver.

Then, the abnormality detection part 51 is operable to perform a given calculation based on the above acquired information, to estimate a disorder/disease developing in the body of the driver. Examples of the disorder/disease include cerebrovascular diseases, heart diseases, gastrointestinal diseases, and syncope, which are difficult for the driver himself/herself to predict sudden development thereof.

The candidate detection part 55 is configured to detect a stop point candidate. Here, a point at which the system 1 causes the vehicle 2 to stop will be referred to as "stop point", and a point which has a potential to become the stop point will be referred to as "stop point candidate". The candidate detection part 55 is operable to acquire map information based on a signal received from the navigation device 33, and detect a plurality of stop point candidates each of which exists in the traveling direction of the vehicle 2 in the acquired map information, and satisfy a given condition.

The required time period estimation part 57 is configured to estimate a time period required to reach each of the stop point candidates detected by the candidate detection part 55. Specifically, the required time period estimation part 57 is operable to search a course to each of the stop point candidates and determine a vehicle speed pattern of the vehicle 2 when the vehicle 2 travels along the course, and to estimate a time period required for the vehicle 2 to reach each of the stop point candidates, based on a corresponding set of the course and the vehicle speed pattern.

The risk estimation part 59 is configured to estimate a rear-end collision risk at each of the stop point candidates detected by the candidate detection part 55. Here, the "rear-end collision risk" means an index regarding a risk that, when assuming that the vehicle 2 stops at each of the stop point candidates, the vehicle 2 will be rear-ended by a following vehicle. The degree of the rear-end collision risk varies depending on a point. The details of estimation of the rear-end collision risk will be described later.

The acceleration estimation part 65 is configured to estimate an acceleration to be generated during traveling of the vehicle 2 to each of the stop point candidates. Specifically, the acceleration estimation part 65 is operable to search a course to each of the stop point candidates and determine a vehicle speed pattern of the vehicle 2 when the vehicle 2 travels along the course, and to estimate a lateral acceleration (i.e., an acceleration in a width direction of the vehicle 2) to be generated during traveling of the vehicle 2 to each of the stop point candidates, based on a corresponding set of the course and the vehicle speed pattern.

The stop point setting part 67 is configured to narrow down the plurality of stop point candidates detected by the candidate detection part 55, based on a given condition, or set one of the stop point candidates, as the stop point. The details of setting of the stop point will be described later.

The vehicle control part 68 is configured to control the behavior of the vehicle 2. Specifically, the vehicle control part 68 is operable to transmit control signals, respectively, to an engine 41 and a brake 42 of the vehicle 2, so as to control the vehicle speed of the vehicle 2. Further, the vehicle control part 68 is operable to subject the image data acquired by the vehicle exterior camera 31, to given processing, to detect a demarcation line of a road on which the vehicle 2 is traveling. Then, the vehicle control part 68 is operable to transmit, to an electric power steering 43, a control signal created based on the detected demarcation line, to control the traveling direction of the vehicle 2.

The storage part 69 is composed of, e.g., a non-volatile memory, and stores therein a variety of information. The information stored in the storage part 69 is read by the abnormality detection part 51 and others, and used for various calculations.

Figure 2:
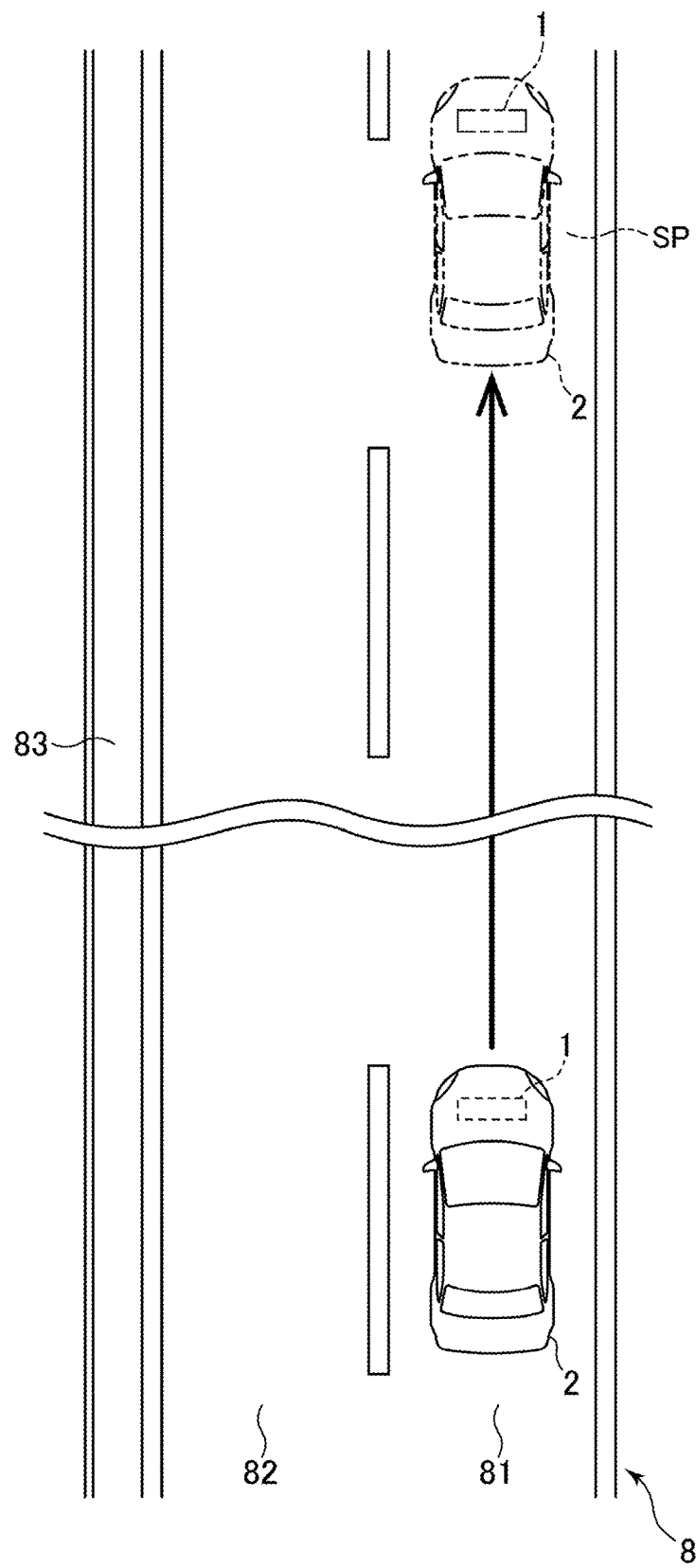
FIG. 2 is an explanatory diagram of a first pattern.
Figure 3:
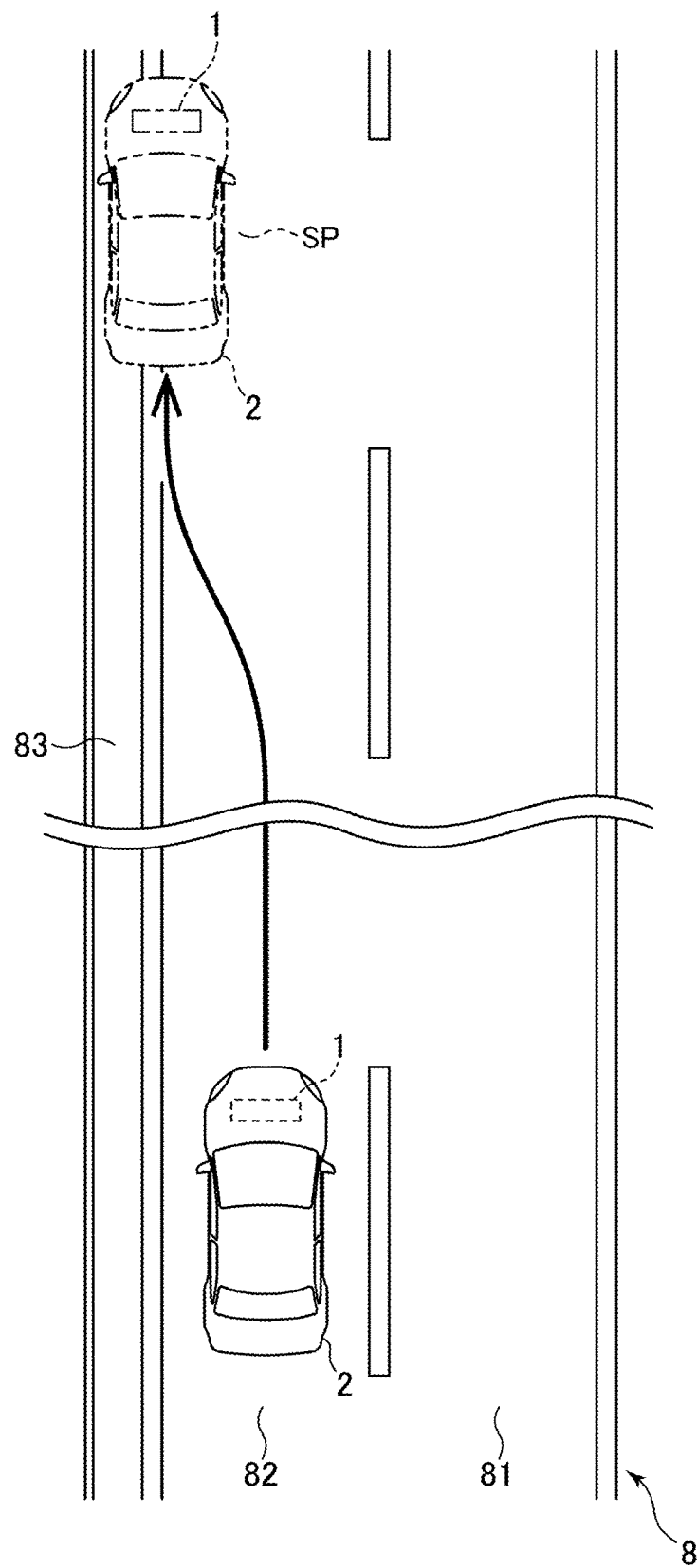
FIG. 3 is an explanatory diagram of a second pattern.
Figure 4:
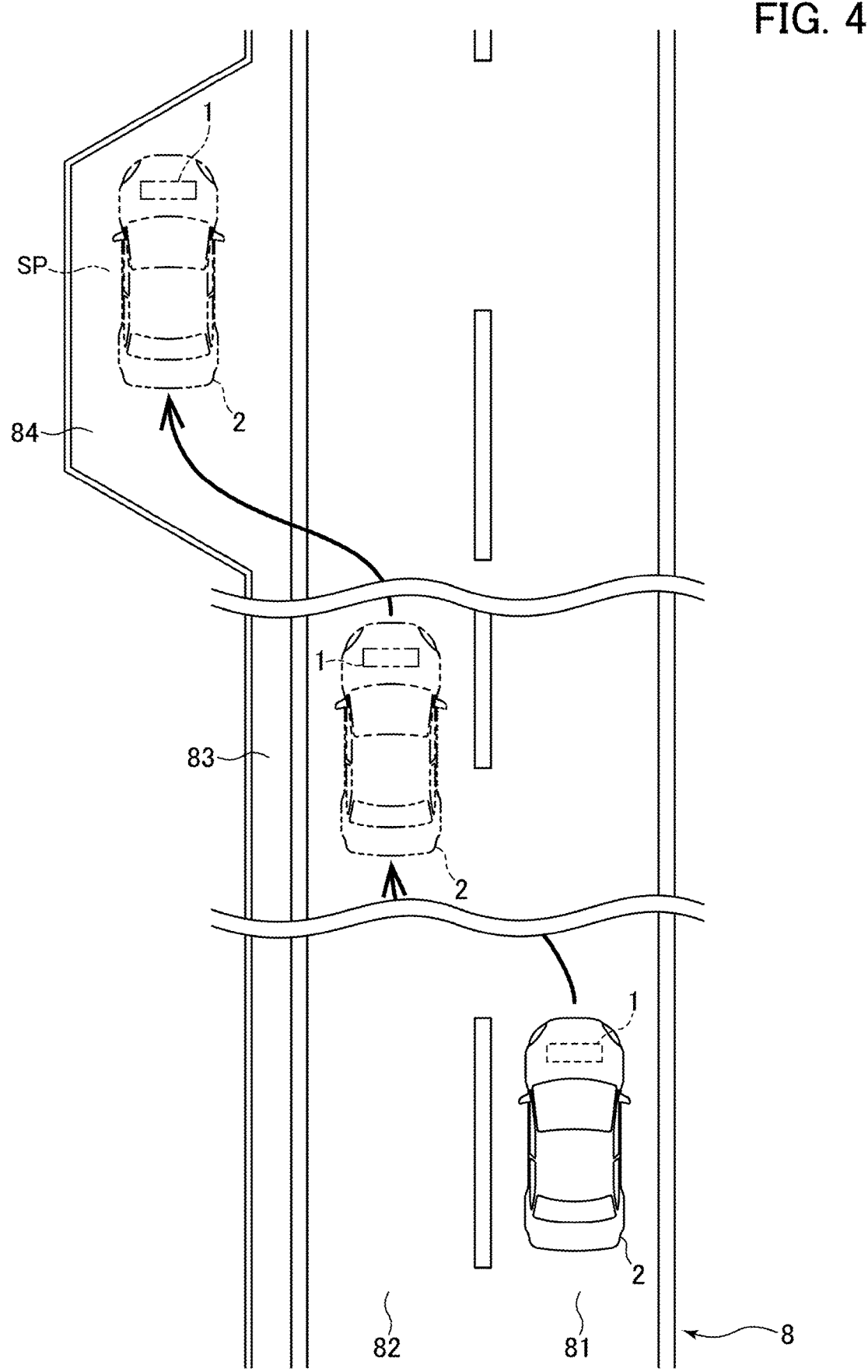
FIG. 4 is an explanatory diagram of a third pattern.

Next, with reference to FIGS. 2 to 4, control of the vehicle 2 by the system 1 will be described. FIGS. 2 to 4 show an environment where it is stipulated that any vehicle shall travel in the left lane, by law or regulation, like the Japanese traffic environment. A road 8 in FIGS. 2 to 4 is a four-lane road, wherein two lanes on one side consists of an overtaking lane 81 and a cruising lane 82. The system 1 is operable, upon satisfaction of a given condition during traveling of the vehicle 2, to control the vehicle 2 to stop at a stop point SP on behalf of the driver, as an emergency measure. The stop point SP is set in one of the following three patterns.

First Pattern

FIG. 2 shows a first pattern in which the stop point setting part 67 (see FIG. 1) of the system 1 operates to set a point within the road 8, as the stop point SP. Specifically, FIG. 2 shows a situation where a given condition is satisfied when the vehicle 2 is traveling in the overtaking lane 81, and a point located on the overtaking lane 81 in the traveling direction of the vehicle 2 is set as the stop point SP. In this situation, the vehicle control part 68 (see FIG. 1) of the system 1 operates to transmit a control signal to the electric power steering 43 (see FIG. 1) so as to controllably cause the vehicle 2 to keep traveling in the overtaking lane 81.

Second Pattern

FIG. 3 shows a second pattern in which the stop point setting part 67 of the system 1 operates to set a road shoulder 83 of the road 8, as the stop point SP. Specifically, FIG. 3 shows a situation where a given condition is satisfied when the vehicle 2 is traveling in the cruising lane 82, and a road shoulder 83 existing in the traveling direction of the vehicle 2 is set as the stop point SP. In this situation, the vehicle control part 68 of the system 1 operates to transmit a control signal to the electric power steering 43 so as to controllably cause the vehicle 2 to keep traveling in the cruising lane 82 and move forwardly and obliquely leftwardly in the vicinity of the stop point SP.

Third Pattern

FIG. 4 shows a third pattern in which the stop point setting part 67 of the system 1 operates to set an emergency parking bay 84 provided on the lateral side of the road 8, as the stop point SP. Specifically, FIG. 4 shows a situation where a given condition is satisfied when the vehicle 2 is traveling in the overtaking lane 81, and an emergency parking bay 84 existing in the traveling direction of the vehicle 2 is set as the stop point SP. In this situation, the vehicle control part 68 of the system 1 operates to transmit a control signal to the electric power steering 43 so as to controllably cause the vehicle 2 to first move from the overtaking lane 81 to the cruising lane 82 and to keep traveling in the cruising lane 82 and move forwardly and obliquely leftwardly in the vicinity of the stop point SP.

In any of the first to third patterns, the vehicle control part 68 operates to, until the vehicle 2 reaches the vicinity of the stop point SP, transmit a control signal to the engine 41 and the brake 42 so as to control the vehicle speed of the vehicle 2 such that it becomes lower than 50 lm/h. Then, the vehicle control part 68 operates to controllably cause the vehicle 2 to stop at the stop point SP. After stop of the vehicle 2, the system 1 operates to blink a blinker and/or sound an alarm to prevent the vehicle 2 from being rear-ended by a following vehicle, and inform the outside of a fact that the driver of the vehicle 2 is in need of rescue.

Figure 5:
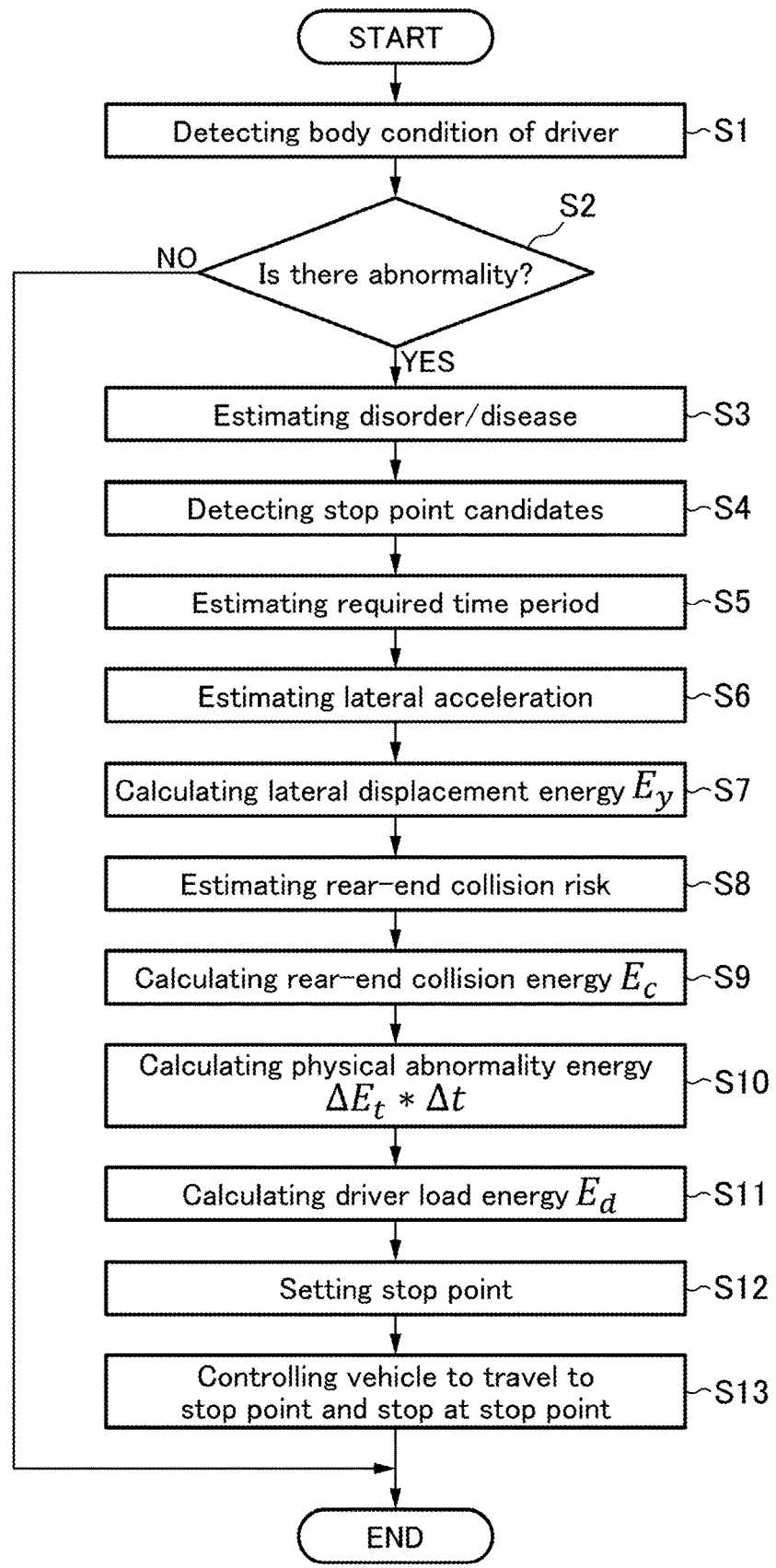
FIG. 5 is a flowchart showing a processing routine to be executed by an ECU.
Figure 6:
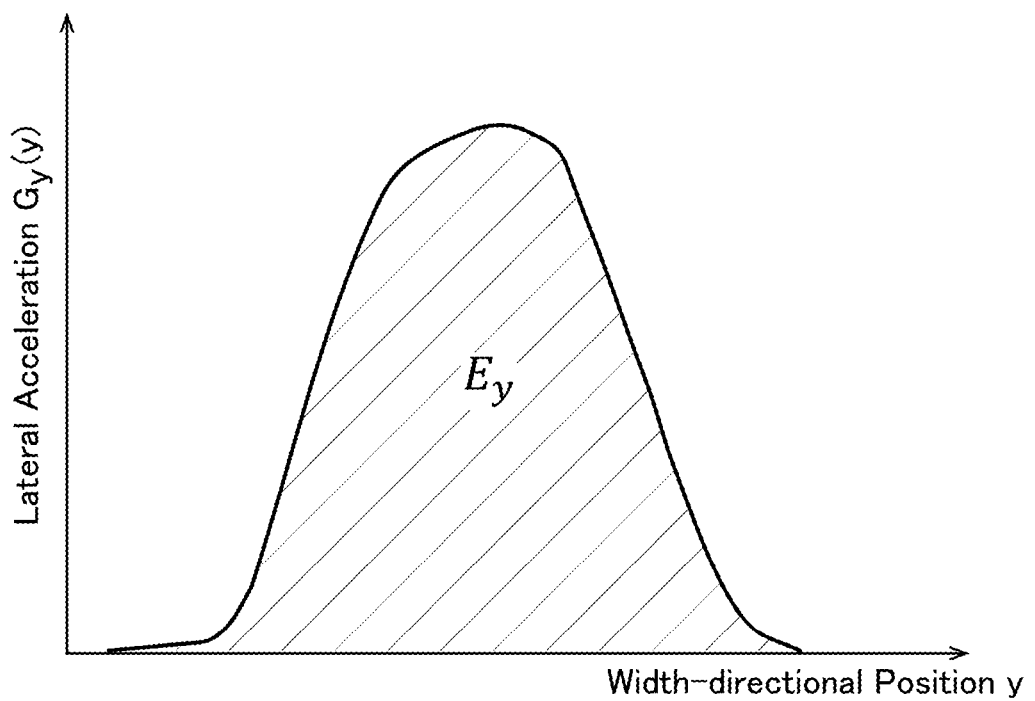
FIG. 6 is a graph showing a change in lateral acceleration.
Figure 7:
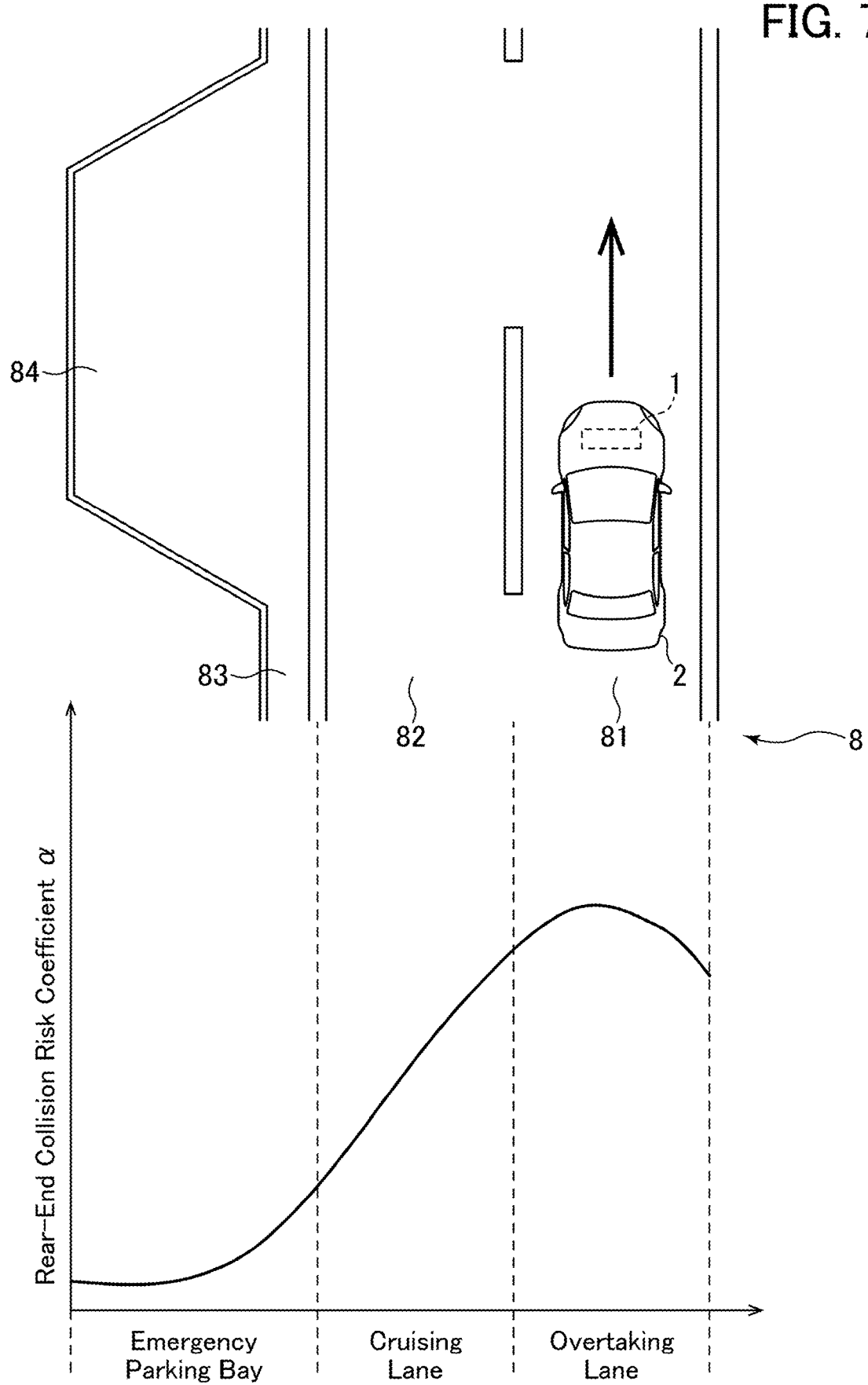
FIG. 7 is a graph for explaining a rear-end collision risk coefficient.
Figures 8, 9:
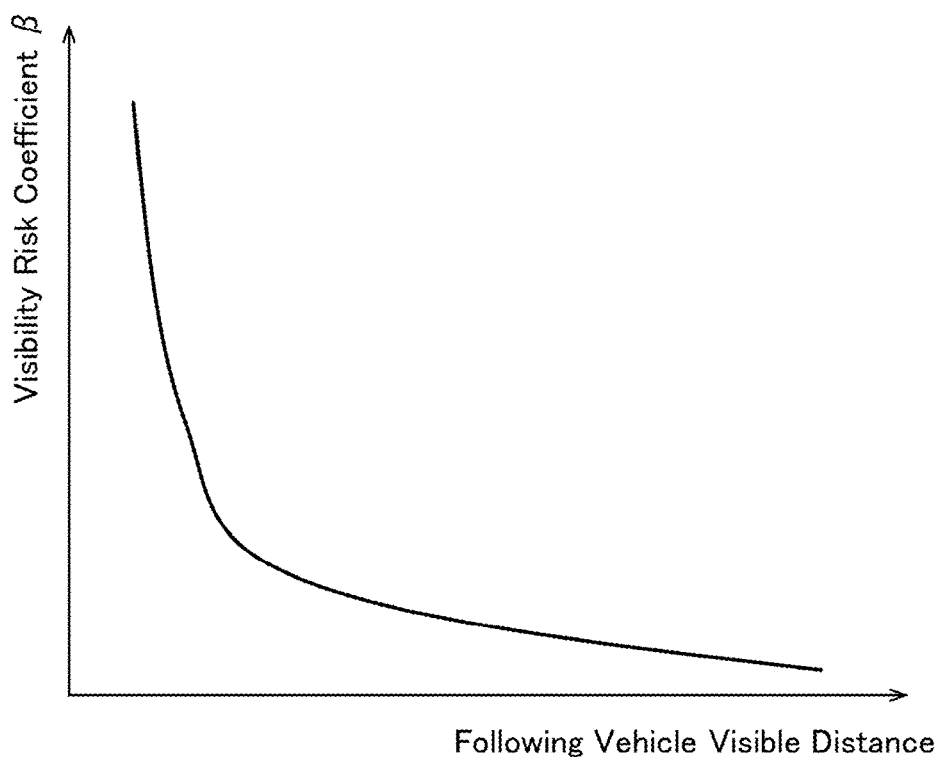
FIG. 8 is a graph for explaining a visibility risk coefficient.
FIG. 9 is a table showing a correspondence relationship between a disorder/disease and a physical abnormality energy per unit time.

Next, with reference to FIGS. 5 to 10, a processing routine to be executed by the ECU 5 (see FIG. 1) will be described. FIG. 5 is a flowchart showing the processing routine to be executed by the ECU 5. During traveling of the vehicle 2, this professing routine will be repeatedly executed with a given period. FIG. 6 is a graph showing a change in lateral acceleration. FIG. 7 is a graph for explaining a rear-end collision risk coefficient $\alpha$. FIG. 8 is a graph for explaining a visibility risk coefficient $\beta$. FIG. 9 is a table showing a correspondence relationship between a disorder/disease and a physical abnormality energy per unit time. FIG. 10 is a table showing a correspondence relationship between a body condition of a driver and a weighting factor. It should be noted that processing to be executed by each of the function blocks of the ECU 5 is also described as being executed by the ECU 5, in the lump, for the sake of simplicity of description.

First of all, in step S1 shown in FIG. 5, the ECU 5 operates to detect the body condition of the driver of the vehicle 2. Specifically, the ECU 5 operates to detect, based on the image data acquired by the vehicle interior camera 32 (see FIG. 1), the state of consciousness of the driver, the open/closed state of the eyes of the driver, the line-of-sight direction of the driver, the center-of-gravity position of the driver, etc.

In step S2, the ECU 5 operates to determine whether or not the driver has a physical abnormality. Specifically, the ECU 5 operates to determine, based on a result of the detection in the step S1, whether or not the driver has a physical abnormality which causes the driver to become unable to drive the vehicle 2 safely. For example, the ECU 5 may be configured to quantify the degree of consciousness of the driver, and, when the resulting quantified value is less than a given threshold, determine that the driver has a physical abnormality. When the driver is determined not to have any physical abnormality (S2: NO), the ECU 5 operates to terminate the vehicle stop support processing routine. On the other hand, when the driver is determined to have a physical abnormality (S2: YES), the ECU 5 proceeds to step S3.

In the step S3, the ECU 5 operates to estimate a disorder/disease of the driver. Specifically, the ECU 5 operates to estimate, based on the result of the detection in the step S1, a disorder/disease developing in the body of the driver. The ECU 5 is capable of estimating that one of paralysis, epilepsy, influenza, myocardial infarction and subarachnoid hemorrhage develops.

In step S4, the ECU 5 operates to detect a stop point candidate. Specifically, the ECU 5 operates to acquire map information, based on a signal received from the navigation device 33, and detect a plurality of points each of which exists within 5 km from the vehicle 2 in the traveling direction of the vehicle 2, and satisfies a given condition, as a plurality of stop point candidates. The given condition may be set based on various factors such as properties of the vehicle 2, properties of the road on which the vehicle 2 is traveling, the body condition of the driver detected in the step S1.

In step S5, the ECUS operates to estimate a time period required to reach each of the stop point candidates. Specifically, the ECU 5 operates to first search, based on a given algorithm, a course to each of the stop point candidates detected in the step S4, and determine a vehicle speed pattern of the vehicle 2 when the vehicle 2 travels along the course. Further, the ECU 5 operates to estimate a time period required to reach each of the stop point candidates, based on a corresponding set of the determined course and vehicle speed pattern.

In step S6, the ECU 5 operates to estimate a lateral acceleration. Specifically, the ECU 5 operates to estimate a lateral acceleration to be generated during traveling of the vehicle 2 to each of the stop point candidates, based on a corresponding set of the course and the vehicle speed pattern determined in the step S5.

In step S7, the ECU 5 operates to calculate lateral movement energy Ey. The lateral movement energy Ey is one example of "first index value" set forth in the appended claims, and is set based on the lateral acceleration of the vehicle 2. Specifically, the lateral movement energy Ey is set based on the following formula f1:

$$E_y = g * \int_0^{\Delta y} G_y(y) dy \quad (f1)$$

In the formula f1, y denotes the position (coordinate value) of the vehicle 2 in the lateral direction of the vehicle 2; $\Delta y$ denotes a movement distance of the vehicle 2 in the width direction of the vehicle 2 during traveling of the vehicle 2 to each of the stop point candidates; $G_y(y)$ denotes a function of a lateral acceleration with respect to y as a variable; and g denotes a gravitational acceleration.

The lateral acceleration $G_y(y)$ to be generated during traveling the vehicle 2 to the stop point candidate changes as shown in, e.g., FIG. 6. That is, the lateral acceleration $G_y(y)$ starts increasing just after the vehicle 2 starts moving in the width direction, and then starts reducing just after the vehicle 2 is decelerated so as to be stopped at the stop point candidate. As shown in the formula f1, the lateral movement energy Ey is calculated by integrating values of the lateral acceleration $G_y(y)$ to be generated during traveling the vehicle 2 to the stop point candidate, and is equivalent to the area of the shaded region in FIG. 6.

Further, on the assumption that a function of the lateral acceleration with respect to a time t as a variable is denoted by $G_y(t)$, and a time period required to reach each of the stop point candidates is denoted by $\Delta t$, the movement distance $\Delta y$ is expressed as the following formula f2:

$$\Delta y = g * \int \int_0^{\Delta t} G_y(t) dt \quad (f2)$$

As can be understood from the formula f2, in a case where the movement distance $\Delta y$ is constant, the lateral acceleration $G_y(t)$ becomes smaller as the required time $\Delta t$ becomes larger. That is, when the vehicle 2 travels to the stop point candidate by taking a relatively long time period, the lateral acceleration $G_y(t)$ becomes relatively small. As a result, the lateral movement energy Ey set based on the formula f1 also become relatively small.

In step S8, the ECU 5 operates to estimate a rear-end collision risk at each of the stop point candidates. Specifically, the ECU 5 operates to estimate a risk that, when assuming that the vehicle 2 stops at each of the stop point candidates detected in the step S4, the vehicle 2 will be rear-ended by a following vehicle.

Here, the estimation of the rear-end collision risk will be described in detail. As mentioned above, the rear-end collision risk is an index regarding a risk that, when assuming that the vehicle 2 stops at each of the stop point candidates, the vehicle 2 will be rear-ended by a following vehicle. Specifically, the ECU 5 operates to estimate, as the rear-end collision risk, a "rear-end collision risk coefficient $\alpha$" and a "visibility risk coefficient $\beta$".

The rear-end collision risk coefficient $\alpha$ means a coefficient which varies depending on a position where the vehicle 2 stops. For example, the rear-end collision risk coefficient $\alpha$ is expressed as the graph in FIG. 7.

A risk that the vehicle 2 is rear-ended by a following vehicle largely varies, depending on at which of the three stop points SP as shown in FIGS. 2 to 4 the vehicle 2 stops. A probability that the vehicle 2 is rear-ended by a following vehicle when the vehicle 2 stops at the stop point SP set in the road shoulder 83 as in the second pattern (see FIG. 3) is empirically clearly lower than a probability that the vehicle 2 is rear-ended by a following vehicle when the vehicle 2 stops at the stop point SP set simply within the road 8 as in the first pattern (see FIG. 2). Further, generally, a vehicle speed of a vehicle traveling in the overtaking lane 81 is greater than that a vehicle traveling in the cruising lane 82. Therefore, even within the road 8, a probability that the vehicle 2 is rear-ended by a following vehicle when the vehicle 2 stops in the overtaking lane 81 is also empirically clearly higher than a probability that the vehicle 2 is rear-ended by a following vehicle when the vehicle 2 stops in the cruising lane 82. Furthermore, a probability that the vehicle 2 is rear-ended by a following vehicle when the vehicle 2 stops at the stop point SP set in the emergency parking bay 84 as in the third pattern (see FIG. 4) is empirically clearly lower than a probability that the vehicle 2 is rear-ended by a following vehicle when the vehicle 2 stops in the road shoulder 83.

Thus, the rear-end collision risk coefficient $\alpha$ which changes between the overtaking lane to the emergency parking bay as shown in the graph of FIG. 7 is preliminarily stored in the storage part 69 (see FIG. 1). In the step S8, the ECU 5 operates to read, from the storage part 69, a value of the rear-end collision risk coefficient $\alpha$ corresponding to each of the stop point candidates detected in the step S4.

The visibility risk coefficient $\beta$ means a coefficient which varies depending on a position where the vehicle 2 stops. For example, the visibility risk coefficient $\beta$ is expressed as the graph in FIG. 8.

A "following vehicle visible distance" described in FIG. 8 means the maximum value of a distance from the following vehicle to the vehicle 2 in a state in which the vehicle 2 which stops is visible from the following vehicle. The "following vehicle visible distance" varies depending on a point where the vehicle 2 stops. For example, in a situation where the vehicle 2 stops on a curved or undulating road, or in a situation where there are obstacles such as walls or roadside trees around a road, the "following vehicle visible distance" with respect to a point where the vehicle stops is relatively small. On the other hand, in a situation where the vehicle stops on a straight or flat road, or in a situation where there are few obstacles around a road, the "following vehicle visible distance" with respect to a point where the vehicle stops is relatively large.

Along with a decrease in the "following vehicle visible distance", it becomes more difficult for a following vehicle to be braked so as to avoid a rear-end collision, so that the "visibility risk coefficient $\beta$" becomes larger. The navigation device 33 stores therein map information, as mentioned above, and the visibility risk coefficient $\beta$ at each point of roads contained in the map information is preliminarily estimated and stored in the storage part 69 (see FIG. 1). In the step S8, the ECU 5 operates to read, from the storage part 69, a value of the visibility risk coefficient $\beta$ corresponding to each of the stop point candidates detected in the step S4.

In step S9, the ECU 5 operates to calculate rear-end collision energy Ec. The rear-end collision energy Ec is one example of "second index value" set forth in the appended claims, and is set based on the rear-end collision risk (i.e., the rear-end collision risk coefficient α and the visibility risk coefficient β). Specifically, the rear-end collision energy Ec is set based on the following formula f3, wherein ΔV denotes a relative speed of a following vehicle with respect to the vehicle 2 which stops. As can be understood from the formula f3, the ECU 5 operates to estimate the rear-end collision energy Ec such that it becomes larger as the relative speed ΔV becomes larger.

$$E_c = \alpha * \beta * \Delta V^2 \quad (f3)$$

The ECU 5 operates to calculate the relative speed ΔV of the following vehicle with respect to the vehicle 2 which stops (vehicle speed: 0 km/h), on the assumption that the following vehicle is traveling at an upper speed limit assigned to each of the stop point candidates in accordance with law or regulation. That is, in a case where the upper speed limit assigned to the stop point candidate in accordance with law or regulation is 100 km/h, the relative speed ΔV is also 100 km/h/

In step S10, the ECU 5 operates to calculate physical abnormality energy $\Delta Et * \Delta t$. The physical abnormality energy $\Delta Et * \Delta t$ is one example of "third index value" set forth in the appended claims, and is a product of the physical abnormality energy ΔEt per unit time (hereinafter be referred to simply as "ΔEt") and the time period Δt required to reach each of the stop point candidates. The ECU 5 operates to set, based on the table shown in FIG. 9, a value corresponding to the disorder/disease estimated in the step S3, as ΔEt Data of the table shown in FIG. 9 is preliminarily stored in the storage part 69 (see FIG. 1). In $\Delta Eta$ (a=1, 3, 5, 8, 10), values of $\Delta Et_{1, 3, 5, 8 \text{ and } 10}$ are different from each other. Specifically, as a value of the subscript becomes larger, a value of ΔEta becomes larger. The value of ΔEta corresponds to the degree of urgency of a disorder/disease. That is, a relatively large value is set with respect to a disorder/disease which has a relatively high urgency and thus requires possibly prompt rescue. On the other hand, a relatively small value is set with respect to a disorder/disease which has a relatively low urgency.

In step S11, the ECU 5 operates to calculate a driver's burden energy Ed. The driver's burden energy Ed is one example of "gross index value" set forth in the appended claims, and is a sum of the lateral movement energy Ey, the rear-end collision energy Ec, and the physical abnormality energy $\Delta Et * \Delta t$, which are weighted using weighting factors $W_1, W_2, W_3$, respectively. Specifically, the driver's burden energy Ed is set based on the following formula f4:

$$E_d = W_1 * E_y + W_2 * E_c + W_3 * \Delta E_t * \Delta t \quad (f4)$$

In this formula, each of the weighting factors $W_2, W_3$ is set to a constant value. The constant value is preliminarily set while taking into account a balance with the remaining energies. By contrast, the weighting factor $W_1$ is set based on the body condition of the driver. Specifically, the ECU 5 operates to set, based on the table shown in FIG. 10, a value corresponding to the body condition of the driver detected in the step S1, as the weighting factor $W_1$, to calculate the driver's burden energy Ed.

Data of the table shown in FIG. 10 is preliminarily stored in the storage part 69 (see FIG. 1). A value of the weighting factor $W_1$ corresponds to easiness to maintain the posture of the driver. For example, in a case where: the driver is conscious; the eyes of the driver is in the open state; the line-of-sight of the driver is coincident with the traveling direction of the vehicle 2; and the center-of-gravity position of the driver is adequate, the driver is in a state in which he/she can easily maintain his/her posture. Thus, a relatively small value of "0.1" is set as the weighting factor $W_1$. On the other hand, in a case where the driver is unconscious, and the center-of-gravity position of the driver is inadequate, the driver is in a state in which the posture thereof is likely to become largely imbalanced. Thus, a relatively large value of "1.0" is set as the weighting factor $W_1$.

In step S12, the ECU 5 operates to set a stop point. Specifically, the ECU 5 operates to set, among the stop point candidates detected in the step S4, one stop point candidate which is smallest in terms of the driver's burden energy Ed, as a stop point.

In step S13, the ECU 5 operates to control traveling of the vehicle 2 to the stop point and stop of the vehicle 2 at the stop point. Specifically, the ECU 5 operates to transmit control signals, respectively, the engine 41, the brake 42 and the electric power steering 43 (see FIG. 1) so as to controllably cause the vehicle 2 to travel to the stop point and stop at the stop point. During this process, the manipulation of the accelerator pedal by the driver is invalidated. On the other hand, the manipulation of the brake pedal by the driver is validated. This is because, even when the driver is becoming unconscious, he/she is likely to attempt to stop the vehicle 2 so as to avoid collision with an obstacle. Here, the vehicle 2 may be configured such that a system for stabilizing the behavior of the vehicle 2, such as an anti-lock braking system or an antiskid brake system, is activated during traveling of the vehicle 2.

Functions/Effects of Embodiment

In the vehicle stop support system according to the above embodiment, one of the plurality of stop point candidates which is smallest in terms of the driver's burden energy Ed as the gross index value is set as the stop point. This makes it possible to comprehensively evaluate a burden imposed on the driver by the lateral acceleration, a burden imposed on the driver by the rear-end collision risk, and a burden imposed on the driver by the physical abnormality of the driver, and set the stop point under the condition that the burdens are well balanced.

In the above embodiment, the stop point setting part 67 is operable to calculate the lateral movement energy Ey (first index value) by integrating values of the lateral acceleration to be generated during traveling of the vehicle 2 to each of the stop point candidates.

According to the above feature, values of the lateral acceleration to be generated during traveling of the vehicle 2 to each of the stop point candidates are integrated, so that a continuously-generated relatively-small lateral acceleration can also be evaluated as the burden on the driver. This makes it possible to more precisely determine the lateral movement energy Ey to set the stop point.

In the above embodiment, the abnormality detection part 51 is operable to detect the state of consciousness of the driver, wherein the stop point setting part 67 is operable to set a weighting to be assigned to the lateral movement energy Ey when the driver is unconscious, to become greater than a weighting to be assigned to the lateral movement energy Ey when the driver is conscious.

According to this feature, the weighting to be assigned to the lateral movement energy Ey when the driver is unconscious is set to become greater than the weighting to be assigned to the lateral movement energy Ey when the driver is conscious, so that it is possible to set the stop point under the condition that the lateral movement energy Ey is relatively small. This makes it possible to suppress the situation where the posture of the driver becomes largely imbalanced, even when the driver is unconscious.

In the above embodiment, the abnormality detection part 51 is operable to detect the open/closed state of the eyes of the driver, wherein the stop point setting part 67 is operable to set a weighting to be assigned to the lateral movement energy Ey when the eyes of the driver are in the closed state, to become greater than a weighting to be assigned to the lateral movement energy Ey when the eyes of the driver are in the open state.

According to this feature, the weighting to be assigned to the lateral movement energy Ey when the eyes of the driver are in the closed state is set to become greater than the weighting to be assigned to the lateral movement energy Ey when the eyes of the driver are in the open state, so that it is possible to set the stop point under the condition that the lateral movement energy Ey is relatively small. This makes it possible to suppress the situation where the posture of the driver becomes largely imbalanced, even when the eyes of the driver are in the closed state.

In the above embodiment, the abnormality detection part 51 is operable to detect the line-of-sight direction of the driver, and determine whether or not the line-of-sight direction of the driver is coincident with the traveling direction of the vehicle 2, wherein the stop point setting part 67 is operable to set a weighting to be assigned to the lateral movement energy Ey when the line-of-sight direction of the driver is not coincident with the traveling direction of the vehicle 2, to become greater than a weighting to be assigned to the lateral movement energy Ey when the line-of-sight direction of the driver is coincident with the traveling direction of the vehicle 2.

"The line-of-sight direction of the driver is coincident with the traveling direction of the vehicle 2" means that the line-of-sight direction of the driver falls within a given range including the traveling direction of the vehicle 2. That is, "the line-of-sight direction of the driver is coincident with the traveling direction of the vehicle 2" means that the line-of-sight direction of the driver is approximately coincident with the traveling direction of the vehicle 2, but does not mean that the line-of-sight direction of the driver is exactly coincident with the traveling direction of the vehicle 2.

According to the above feature, the weighting to be assigned to the first index value when the line-of-sight direction of the driver is not coincident with the traveling direction of the vehicle 2, to become greater than the weighting to be assigned to the lateral movement energy Ey when the line-of-sight direction of the driver is coincident with the traveling direction of the vehicle 2, so that it is possible to set the stop point under the condition that the lateral movement energy Ey is relatively small. This makes it possible to suppress the situation where the posture of the driver becomes largely imbalanced, even when the line-of-sight direction of the driver is not coincident with the traveling direction of the vehicle 2.

In the above embodiment, the risk estimation part 59 is operable to estimate the rear-end collision risk (visibility risk coefficient $\beta$) such that it becomes higher as the following vehicle visible distance with respect to each of the plurality of stop point candidates becomes smaller.

According to this feature, as the following vehicle visible distance becomes smaller, i.e., as the stop point candidate has a higher degree of difficulty in allowing the following vehicle to be braked so as to avoid a rear-end collision, the rear-end collision risk is estimated such that it becomes higher, and the lateral movement energy Ey is calculated such that it becomes larger. This makes it possible to set the stop point such that it enables the vehicle 2 to be stopped more safely.

In the above embodiment, the stop point setting part 67 is operable to calculate the rear-end collision energy Ec (second index value) such that it becomes larger as the relative vehicle speed $\Delta V$ of the following vehicle with respect to the vehicle 2 stopping at each of the plurality of stop point candidates becomes larger.

According to this feature, as the relative vehicle speed $\Delta V$ of the following vehicle with respect to the vehicle 2 becomes higher, i.e., as the stop point candidate has a higher degree of difficulty in allowing the following vehicle to be braked so as to avoid a rear-end collision, the rear-end collision energy Ec is calculated such that it becomes larger. This makes it possible to set the stop point such that it enables the vehicle 2 to be stopped more safely.

In the above embodiment, the stop point setting part 67 is operable to estimate the relative vehicle speed $\Delta V$, based on an upper speed limit set to each of the plurality of stop point candidates in accordance with law or regulation.

This makes it possible to easily estimate the relative vehicle speed $\Delta V$ of the following vehicle with respect to the vehicle 2 stopping at each of the plurality of stop point candidates.

In the above embodiment, the system 1 comprises the storage part 69 preliminarily storing therein a plurality of values each corresponding to a respective one of a plurality of physical abnormalities, wherein the stop point setting part 67 is operable to calculate the physical abnormality energy $\Delta Et^*\Delta t$ (third index value) by reading, from the storage part 69, one of the stored values $\Delta Et$ which corresponds to the abnormality detected by the abnormality detection part 51, and multiplying the read $\Delta Et$ by a time period $\Delta t$ required to reach each of the plurality of stop point candidates.

According to this feature, the physical abnormality energy $\Delta Et^*\Delta t$ is calculated based on the physical abnormality of the driver detected by the abnormality detection part 51, and the time period $\Delta t$ required to reach each of the plurality of stop point candidates. Thus, for example, by setting $\Delta Et$ having a relatively large value with respect to a physical abnormality having a relatively high urgency, the physical abnormality energy $\Delta Et^*\Delta t$ is calculated as a relatively larger value. Thus, in a case where the physical abnormality of the driver has a relatively high urgency, it becomes possible to quickly stop the vehicle 2 to start a rescue operation. On the other hand, by setting $\Delta Et$ having a relatively small value with respect to a physical abnormality having a relatively low urgency, it becomes possible to set the stop point from among a larger number of stop point candidates.

Further, the plurality of values of $\Delta Et$ each corresponding to a respective one of the plurality of physical abnormalities are preliminarily stored in the storage part 69, so that it is possible to suppress a situation where, due to disturbance or the like, the physical abnormality energy $\Delta Et^*\Delta t$ is calculated undesirably based on $\Delta Et$ having an inappropriately low or high value, with respect to each of the plurality of physical abnormalities. This makes it possible to set the stop point based on the physical abnormality of the driver.

As above, the present invention has been described based on one specific embodiment. However, it should be understood that the present invention is not limited to the specific embodiment. That is, various changes and modifications will be apparent to a person of ordinary skill in the art. Therefore, unless otherwise such changes and modifications depart from the scope of the present invention hereinafter defined, they should be construed as being included therein.

In the above embodiment, the abnormality detection part 51 of the ECU 5 is configured to detect the physical abnormality of the driver based on image data acquired by the vehicle interior camera 32. However, the present invention is not limited to this configuration. For example, in a case where the vehicle stop support system according to the present invention is equipped in a vehicle provided with an infrared sensor for detecting a body temperature or a pulse wave of a driver, a seat sensor for detecting a center-of-gravity position or a pulse wave depending on the posture of the driver, or the like, the abnormality detection part in the present invention may be configured to detect the physical abnormality of the driver based on detection information from such a sensor.

In the above embodiment, the required time period estimation part 57 of the ECU 5 is configured to search a course to each of the stop point candidates and determine a vehicle speed pattern of the vehicle 2 when the vehicle 2 travels along the course. However, the present invention is not limited to this configuration. For example, the required time period estimation part in the present invention may be configured to instruct the navigation device to perform search of the course and determination of the speed pattern, and, based on information provided from the navigation device, estimate the required time period.

In the above embodiment, the visibility risk coefficient β as one example of the rear-end collision risk is set such that it continuously increases along with a decrease in the following vehicle visible distance with respect to each of the stop point candidates. However, the present invention is not limited to this configuration. For example, the visibility risk in the present invention may be set such that it increases stepwise along with a decrease in the following vehicle visible distance.

LIST OF REFERENCE CHARACTERS

1: vehicle stop support system (system)
2: vehicle
51: abnormality detection part
55: candidate detection part
59: risk estimation part
65: acceleration estimation part
67: stop point setting part
68: vehicle control part
69: storage part
SP: stop point

The invention claimed is:

1. A vehicle stop support system for supporting stop of a vehicle which is traveling, comprising:
   an abnormality detection part for detecting a physical abnormality of a driver;
   a candidate detection part for detecting a plurality of stop point candidates which exist in a traveling direction of the vehicle;
   an acceleration estimation part for estimating a lateral acceleration to be generated during traveling of the vehicle to each of the stop point candidates;
   a risk estimation part for estimating a rear-end collision risk which is a risk that, when assuming that the vehicle stops at each of the stop point candidates, the vehicle will be rear-ended by a following vehicle;
   a stop point setting part for setting a stop point; and
   a vehicle control part for controlling the vehicle to travel to the stop point and stop at the stop point,
   wherein the stop point setting part is operable to: calculate, with respect to each of the stop point candidates, a first index value which increases along with an increase in the lateral acceleration, a second index value which increases along with an increase in the rear-end collision risk, a third index value which is determined based on the abnormality detected by the abnormality detection part, and a gross index value, wherein the gross index value is obtained by subjecting the first index value, the second index value and the third index value to weighting, and summing the resulting weighted index values; and then set one of the plurality of stop point candidates which is smallest in terms of the gross index value, as the stop point.

2. The vehicle stop support system according to claim 1, wherein the stop point setting part is operable to calculate the first index value by integrating values of the lateral acceleration to be generated during traveling of the vehicle to each of the stop point candidates.

3. The vehicle stop support system according to claim 2, wherein the abnormality detection part is operable to detect a state of consciousness of the driver, and wherein the stop point setting part is operable to set a weighting to be assigned to the first index value when the driver is unconscious, to become greater than a weighting to be assigned to the first index value when the driver is conscious.

4. The vehicle stop support system according to claim 3, wherein the abnormality detection part is operable to detect an open/closed state of eyes of the driver, and wherein the stop point setting part is operable to set a weighting to be assigned to the first index value when the eyes of the driver are in the closed state, to become greater than a weighting to be assigned to the first index value when the eyes of the driver are in the open state.

5. The vehicle stop support system according to claim 4, wherein the abnormality detection part is operable to detect a line-of-sight direction of the driver, and determine whether or not the line-of-sight direction of the driver is coincident with the traveling direction of the vehicle, and wherein the stop point setting part is operable to set a weighting to be assigned to the first index value when the line-of-sight direction of the driver is not coincident with the traveling direction of the vehicle, to become greater than a weighting to be assigned to the first index value when the line-of-sight direction of the driver is coincident with the traveling direction of the vehicle.

6. The vehicle stop support system according to claim 1, wherein the risk estimation part is operable to estimate the rear-end collision risk such that it becomes higher as a following vehicle visible distance with respect to each of the plurality of stop point candidates becomes smaller.

7. The vehicle stop support system according to claim 1, wherein the stop point setting part is operable to calculate the second index value such that it becomes larger as a relative vehicle speed of the following vehicle with respect to the vehicle stopping at each of the plurality of stop point candidates becomes larger.

8. The vehicle stop support system according to claim 7, wherein the stop point setting part is operable to estimate the relative vehicle speed, based on an upper speed limit assigned to each of the plurality of stop point candidates in accordance with law or regulation.

9. The vehicle stop support system according to claim 1, which further comprises a storage part preliminarily storing therein a plurality of values each corresponding to a respective one of a plurality of physical abnormalities, wherein the stop point setting part is operable to calculate the third index value by reading, from the storage part, one of the stored values which corresponds to the abnormality detected by the abnormality detection part, and multiplying the read value by a time period required to reach each of the plurality of stop point candidates.

\* \* \* \* \*